(12) United States Patent
Pidaparthi et al.

(10) Patent No.: US 10,565,214 B2
(45) Date of Patent: Feb. 18, 2020

(54) INTELLIGENT DATABASE CONTROL SYSTEMS WITH AUTOMATED REQUEST ASSESSMENTS

(71) Applicant: Bank of America Corporation, Charlotte, NC (US)

(72) Inventors: Sita Maha Lakshmi Pidaparthi, Hyderabad (IN); Suki Ramasamy, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 297 days.

(21) Appl. No.: 15/465,864

(22) Filed: Mar. 22, 2017

(65) Prior Publication Data

US 2018/0276218 A1   Sep. 27, 2018

(51) Int. Cl.
| | |
|---|---|
| G06F 16/00 | (2019.01) |
| G06F 16/2457 | (2019.01) |
| G06N 20/00 | (2019.01) |
| G06F 16/25 | (2019.01) |
| G06F 21/62 | (2013.01) |
| G06F 21/55 | (2013.01) |

(52) U.S. Cl.
CPC ...... *G06F 16/24578* (2019.01); *G06F 16/258* (2019.01); *G06F 21/552* (2013.01); *G06F 21/6227* (2013.01); *G06N 20/00* (2019.01); *G06F 2221/2105* (2013.01)

(58) Field of Classification Search
CPC ............. G06F 16/24578; G06F 16/258; G06F 21/552; G06F 21/6227; G06F 221/2105; G06N 20/00
USPC ......................................................... 707/723
See application file for complete search history.

(56) References Cited

U.S. PATENT DOCUMENTS

| | | | |
|---|---|---|---|
| 7,664,778 B2 | 2/2010 | Yagoub et al. | |
| 8,341,178 B2 | 12/2012 | Belknap et al. | |
| 8,407,081 B1* | 3/2013 | Rajasenan | G06Q 10/0637 |
| | | | 705/7.42 |
| 8,606,817 B2 | 12/2013 | Metzger et al. | |
| 8,903,801 B2 | 12/2014 | Belknap et al. | |

(Continued)

OTHER PUBLICATIONS

US 9,602,989 B2, 03/2017, Schmit et al. (withdrawn)

(Continued)

*Primary Examiner* — Thanh-Ha Dang
(74) *Attorney, Agent, or Firm* — Banner & Witcoff, Ltd.; Michael A. Springs

(57) ABSTRACT

Aspects of the disclosure relate to intelligent database control systems for performing automated request assessments. In one embodiment, a computing device may receive, via a communication interface, a database request from a user computing device. The computing device may generate a legitimacy score associated with the database request based on one or more predetermined definitions. If the legitimacy score is above a predetermined threshold, the computing device may format the database request based on one or more of the predetermined definitions and the legitimacy score and command, via the communication interface, one or more databases to execute the database request. The computing device may format result set generated from the executed database request and transmit, via the communication interface, the formatted result set to the user computing device.

16 Claims, 10 Drawing Sheets

(56) References Cited

U.S. PATENT DOCUMENTS

| | | | |
|---|---|---|---|
| 8,930,395 B2 | 1/2015 | Sharma et al. | |
| 9,602,544 B2 | 3/2017 | Madhav et al. | |
| 9,602,550 B2 | 3/2017 | Bezilla et al. | |
| 9,602,556 B1 | 3/2017 | Cham | |
| 9,602,573 B1 | 3/2017 | Abu-Ghazaleh et al. | |
| 9,602,585 B2 | 3/2017 | Falkenberg | |
| 9,602,590 B1 | 3/2017 | Lu et al. | |
| 9,602,597 B2 | 3/2017 | Micucci et al. | |
| 9,602,600 B1 | 3/2017 | Tsao | |
| 9,602,608 B2 | 3/2017 | Brady, Jr. et al. | |
| 9,602,614 B1 | 3/2017 | Shankaran et al. | |
| 9,602,623 B2 | 3/2017 | Kuusilinna et al. | |
| 9,602,625 B2 | 3/2017 | Russell et al. | |
| 9,602,636 B1 | 3/2017 | Vincent et al. | |
| 9,602,656 B2 | 3/2017 | Huang et al. | |
| 9,602,663 B1 | 3/2017 | Koster | |
| 9,602,667 B1 | 3/2017 | Bradley et al. | |
| 9,602,669 B1 | 3/2017 | Griffith et al. | |
| 9,602,678 B2 | 3/2017 | Abe | |
| 9,602,679 B2 | 3/2017 | Macauley et al. | |
| 9,602,683 B2 | 3/2017 | Park et al. | |
| 9,602,710 B2 | 3/2017 | Ikeda et al. | |
| 9,602,738 B2 | 3/2017 | Choe et al. | |
| 9,602,775 B2 | 3/2017 | Barnett, Jr. | |
| 9,602,783 B2 | 3/2017 | Sugishita et al. | |
| 9,602,806 B1 | 3/2017 | Stafford et al. | |
| 9,602,849 B2 | 3/2017 | Lin et al. | |
| 9,602,855 B2 | 3/2017 | Abed | |
| 9,602,860 B2 | 3/2017 | Laska et al. | |
| 9,602,862 B2 | 3/2017 | Williams et al. | |
| 9,602,864 B2 | 3/2017 | Cholas et al. | |
| 9,602,868 B2 | 3/2017 | Malik et al. | |
| 9,602,891 B2 | 3/2017 | Winograd et al. | |
| 9,602,897 B2 | 3/2017 | Coffey et al. | |
| 9,602,910 B2 | 3/2017 | Kim et al. | |
| 9,602,938 B2 | 3/2017 | Goldstein et al. | |
| 9,602,977 B1 | 3/2017 | Gueziec | |
| 9,602,981 B2 | 3/2017 | Shuman et al. | |
| 9,602,986 B2 | 3/2017 | Vendrow et al. | |
| 9,603,000 B2 | 3/2017 | Tagg et al. | |
| 9,603,006 B2 | 3/2017 | Evans et al. | |
| 9,603,020 B2 | 3/2017 | Kim | |
| 9,603,022 B2 | 3/2017 | Laarakkers et al. | |
| 9,603,023 B2 | 3/2017 | Ferguson et al. | |
| 9,603,044 B2 | 3/2017 | Zhang et al. | |
| 9,603,070 B2 | 3/2017 | Jun et al. | |
| 9,603,117 B2 | 3/2017 | Flynn et al. | |
| 9,603,151 B2 | 3/2017 | Rune et al. | |
| 9,603,158 B1 | 3/2017 | Ross et al. | |
| 9,603,170 B2 | 3/2017 | Kumar et al. | |
| 2006/0040711 A1* | 2/2006 | Whistler | H04W 24/00 455/566 |
| 2006/0047617 A1* | 3/2006 | Bacioiu | G06K 9/6262 706/59 |
| 2008/0127339 A1* | 5/2008 | Swain | H04L 51/12 726/22 |
| 2009/0077008 A1* | 3/2009 | Francis | G06F 16/258 |
| 2011/0271146 A1* | 11/2011 | Mork | G06F 16/2453 714/37 |
| 2017/0344745 A1* | 11/2017 | Wadley | G06F 21/57 |
| 2017/0364590 A1* | 12/2017 | Hill | G06F 16/951 |

OTHER PUBLICATIONS

Benoit, Darcy G., "Automatic Diagnosis of Performance Problems in Database Managment Systems," thesis submitted to the School of Computing, Queen's University, Kingston, Ontario, Canada, Jun. 2003, 163 pages.

McCarthy, et al, "The Architecture of an Active Data Base Management System," ACM SIGMOD Record; 18 (2):215-224 • Jun. 1989.

McHugh, et al, "Lore: A Database Management System for Semistructured Data," SIGMOD Record, vol. 26, No. 3, Sep. 1997, pp. 54-66.

Astrahan, et al, "System R: Relational Approach to Database Management," ACM Transactions on Database Systems, vol. 1, No. 2, Jun. 1976, pp. 97-137.

Pavlo, et al, "Skew-Aware Automatic Database Partitioning in Shared-Nothing, Parallel OLTP Systems," SIGMOD'12, May 20-24, 2012, Scottsdale, Arizona, USA.

* cited by examiner

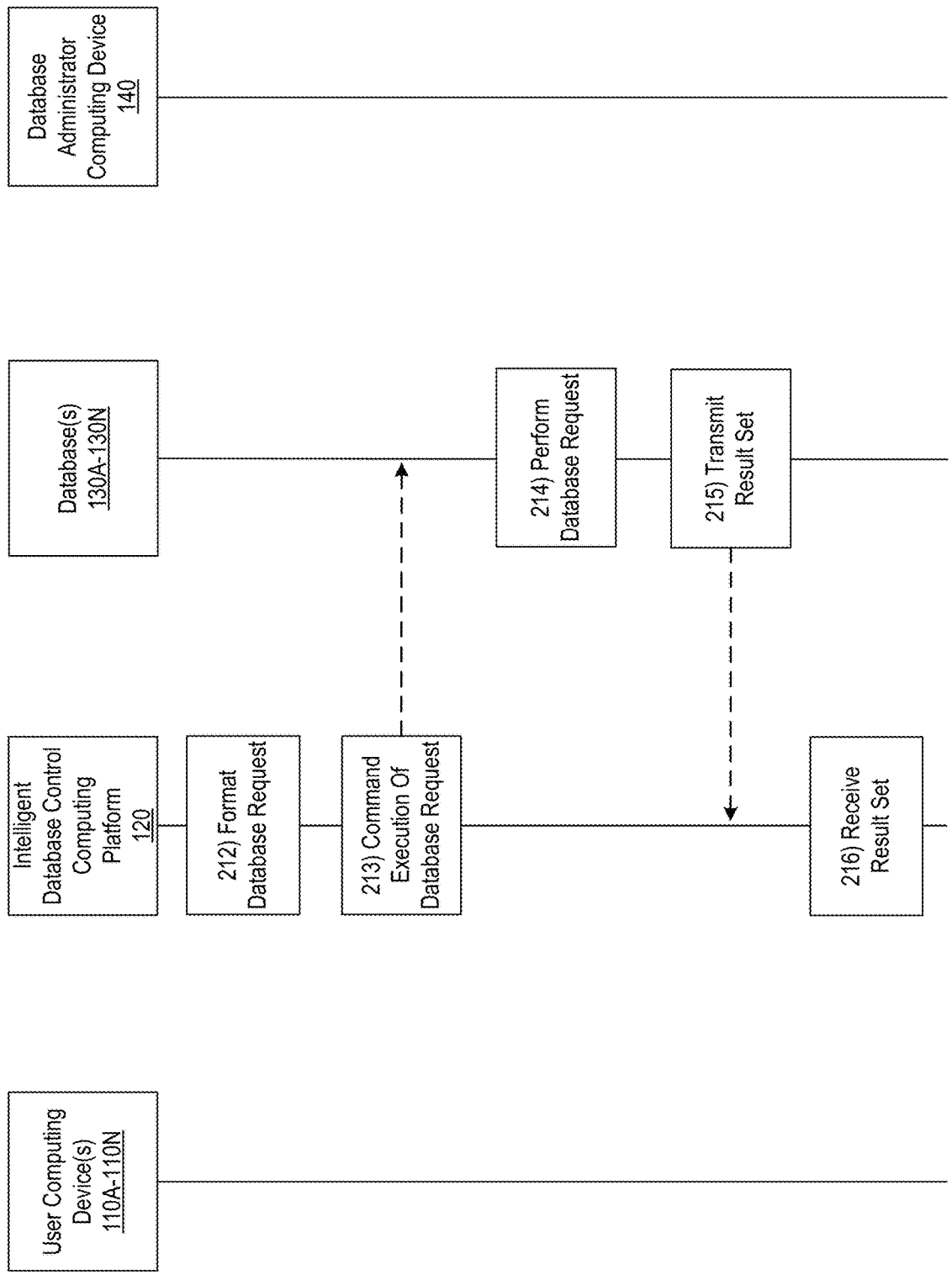

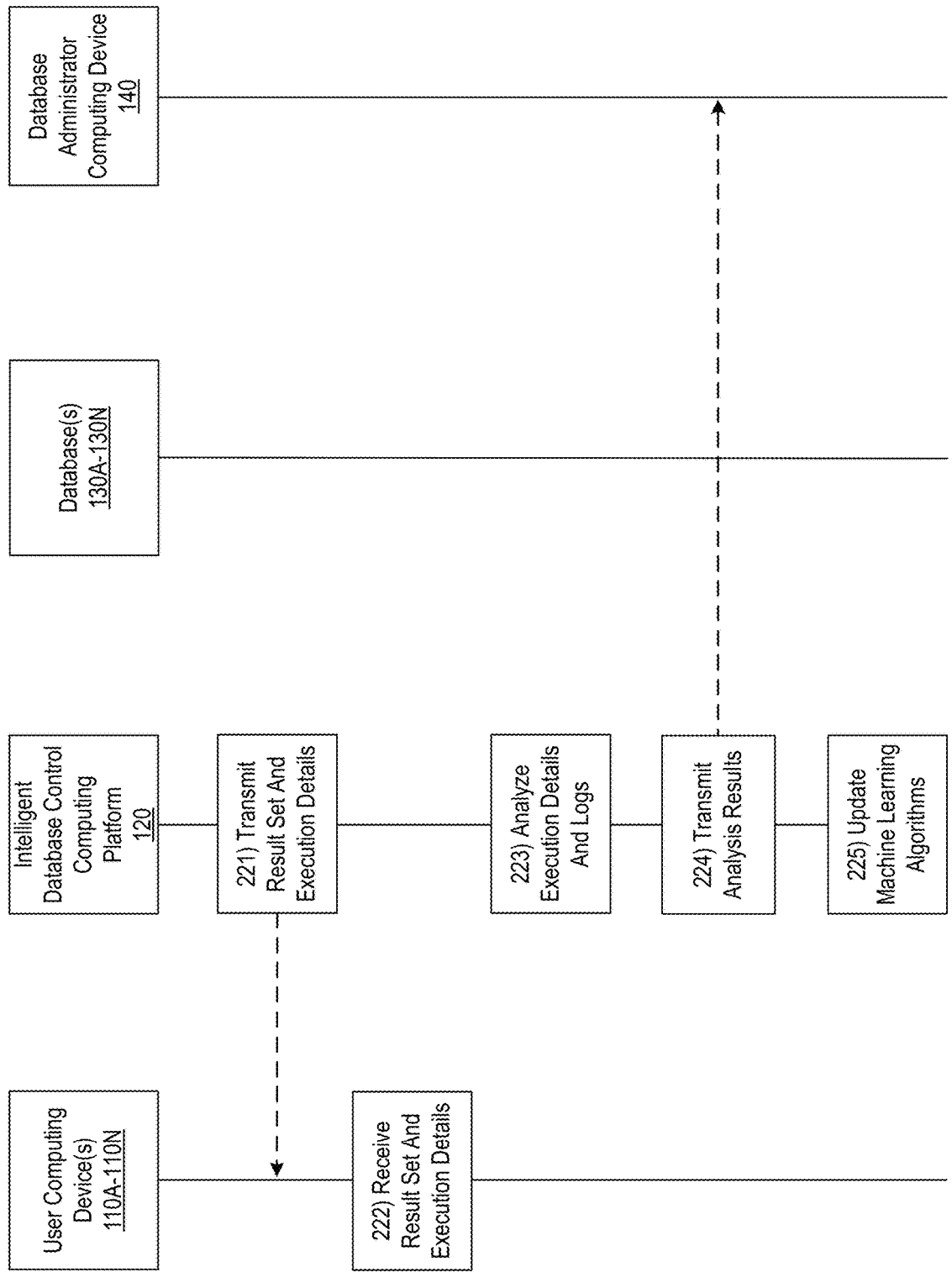

INTELLIGENT DATABASE CONTROL SYSTEMS WITH AUTOMATED REQUEST ASSESSMENTS

FIELD

Aspects of the disclosure relate to database control systems. In particular, one or more aspects of the disclosure relate to intelligent database control systems for performing automated request assessments.

BACKGROUND

In database control systems, a database administrator may be tasked, in some instances, with receiving database requests to execute a series of queries from users without appropriate execution permissions. The database administrator may then be required to validate the authenticity of the users associated with the database requests, examine the database requests for definition statements (e.g., create, delete, drop, alter, and the like), analyze the data sensitivity result sets for which the users are allowed access, examine the order of execution when multiple scripts are provided, analyze the query syntaxes for optimized usage of database resources, examine the request execution duration so that it does not affect the other requests in a queue, package the result sets to the users in the required format and communication mode, and the like. Such processes may become complex to control when the database administrator is required to cater the requests through a plurality of schemas and databases. Further, by requiring the database administrator to perform the aforementioned tasks, the database control system may be prohibitive to the implementation of machine learning based automated query methods. Moreover, the ad hoc queries provided by the database administrator in response to database requests from users without appropriate execution permissions may negatively impact the processing performance and efficiency, memory allocation, and input/output protocols of the database control system.

SUMMARY

Aspects of the disclosure address these and/or other technological shortcomings by providing an intelligent database control system for performing automated request assessments.

In particular, one or more aspects of the disclosure provide effective, efficient, scalable, and convenient technical solutions that address and overcome the technical problems associated with receiving database requests from users without appropriate execution permissions at database control systems. For example, one or more aspects of the disclosure provide techniques for performing automated request assessments.

In accordance with one or more embodiments, a computing device having at least one processor, communication interface, input mechanism, and memory, may receive, via the communication interface, from a user computing device, a database request. The computing device may generate a legitimacy score associated with the database request based on one or more predetermined definitions and may determine whether the generated legitimacy score is above a predetermined threshold. Responsive to determining that the legitimacy score is above the predetermined threshold, the computing device may format the database request based on one or more of the predetermined definitions and the legitimacy score. The computing device may command or instruct, via the communication interface, one or more databases to execute the database request. The computing device may format a result set generated from the executed database request and may transmit, via the communication interface, to the user computing device, the formatted result set.

In some embodiments, the legitimacy score may be generated by the computing device by way of machine learning algorithms such as linear regression, logistic regression, decision tree, support vector machine (SVM), Naïve Bayes, k-nearest neighbors (KNM), k-means, random forest, dimensionality reduction, gradient boosting (GBM), AdaBoost, and the like.

In some embodiments, the computing device may be further configured to receive, via the communication interface, from the one or more databases, execution details and logs corresponding to the executed database request. The computing device may analyze the execution details and logs based on one or more of Pareto analysis, causal analysis, and failure mode and effect analysis and, based on the analysis the execution details and logs, may update the machine learning algorithms used to generate the legitimacy score.

In some embodiments, the computing device may be further configured to decode the database request into a plurality of objects and perform checks of each of the plurality of objects based on the predetermined definitions, wherein the predetermined definitions may include one or more of access definitions, role definitions, and optimization levels.

In some embodiments, the computing device may be further configured to transmit, via the communication interface, to a database administrator computing device, an alert regarding the database request responsive to determining that the legitimacy score is below the predetermined threshold.

In some instances, the one or more databases are one of a relational database and a NoSQL database.

These features, along with many others, are discussed in greater detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIGS. 2A, 2B, 2C, 2D, 2E, and 2F depict an illustrative event sequence for performing automated database request assessments in accordance with one or more example embodiments;

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope of the described aspects and embodiments. Aspects described herein are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Figure 1A:
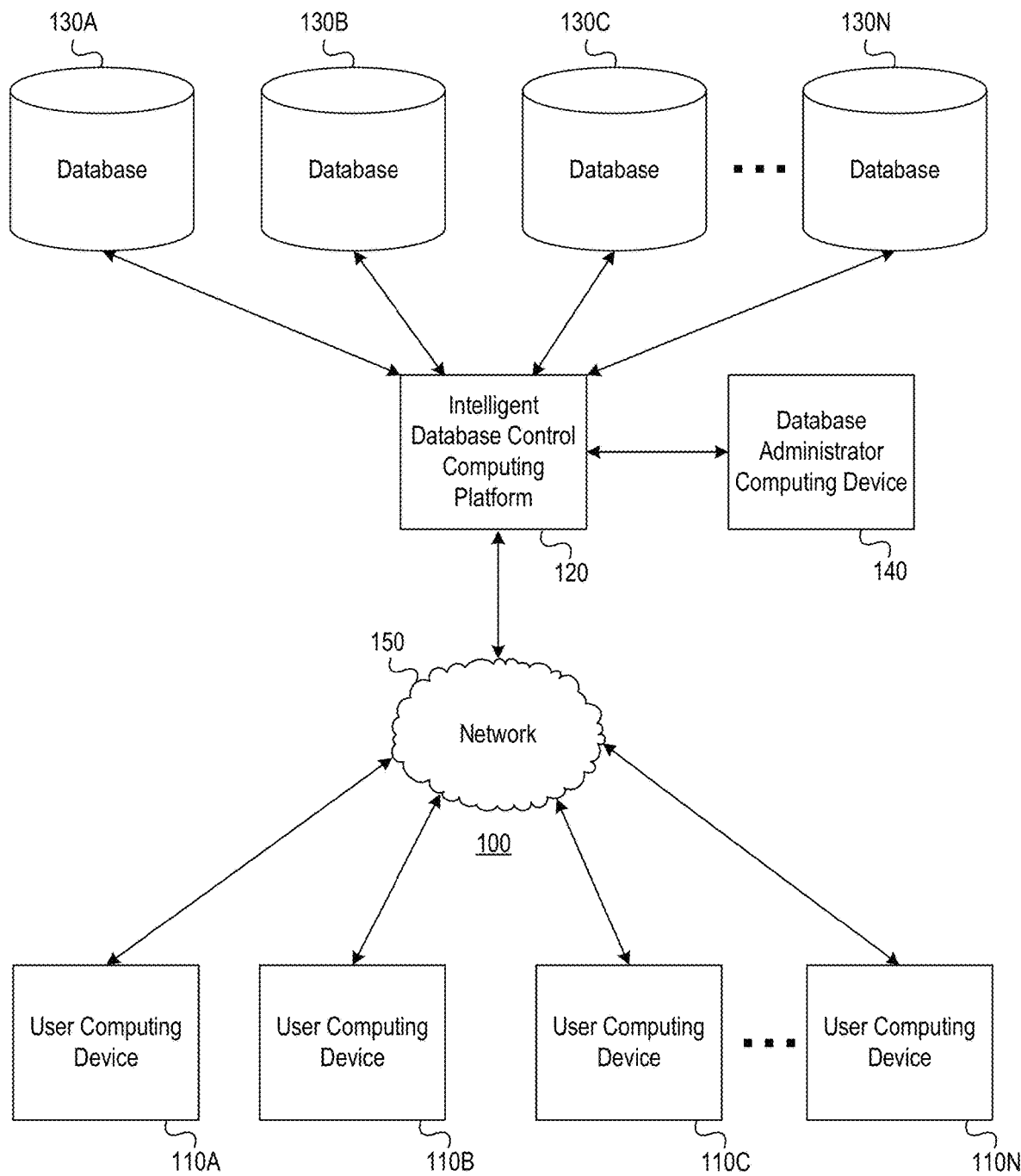
FIGS. 1A and 1B depict an illustrative computing environment for performing automated request assessments in accordance with one or more example embodiments.
Figure 1B:
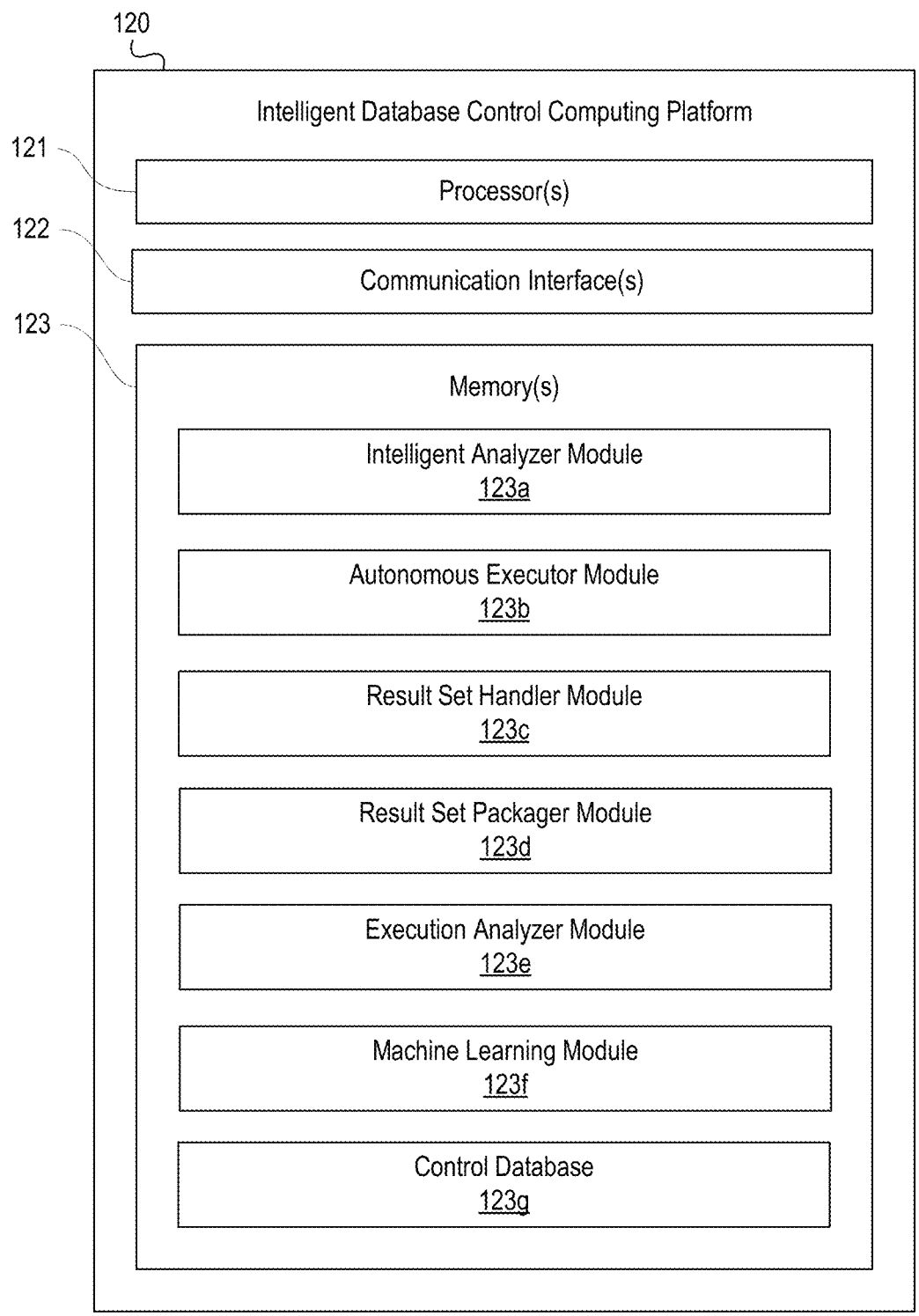

FIGS. 1A and 1B depict an illustrative computing environment for an intelligent database control system configured to perform automated request assessments in accordance with one or more example embodiments.

Referring to FIG. 1A, computing environment 100 may include one or more computing devices and/or other computer systems. For example, computing environment 100 may include one or more user computing devices 110A-110N, intelligent database control computing platform 120, one or more databases 130A-130N, and database administrator computing device 140. Each of the one or more user computing devices 110A-110N, intelligent database control computing platform 120, each of the one or more databases 130A-130N, and database administrator computing device 140 may be configured to communicate with each other, as well as with other computing devices, for example, through network 150. In some instances, intelligent database control computing platform 120, each of the one or more databases 130A-130N, and database administrator computing device 140 may be configured to communicate with each other through a local and/or internal network. Such a local and/or internal network may be configured to interface with network 150 and user computing devices 110A-110N. Furthermore, each component of the computing environment 100 may include a computing device (or system) having some or all of the structural components of intelligent data control computing device 401 described below in regard to FIG. 4.

Each of the user computing devices 110A-110N may be configured to interact with the one or more databases 130A-130N by way of intelligent database control computing platform 120. In particular, each of the user computing devices 110A-110N may be configured to receive and transmit information corresponding to database requests, which may be associated with local, remote, and/or distributed database transactions. The database requests provided by the one or more user computing devices 110A-110N may include one or more of a user identification (e.g., user ID) and password, email, an indication of one or more databases from databases 130A-130N to be involved in the request, schema details associated with the user, format of the database query, and the like. In some instances, the user computing devices 110A-110N may request performance of the database transaction through a database request provided by way of an application configured to interface with intelligent database control computing platform 120. Additionally and/or alternatively, the database request may be sent by way of a web application (e.g., web graphical user interface built on shell script and/or power shell script) associated with intelligent database control computing platform 120.

Intelligent database control computing platform 120 may include a plurality of computing devices and associated computing hardware and software that may host various applications configured to receive, transmit, and/or store data, control and/or direct actions of other devices and/or computer systems (e.g., user computing device 110A-110N, databases 130A-130N, and database administrator computing device 140), and/or perform other functions, as discussed in greater detail below. In some arrangements, intelligent database control computing platform 120 may include and/or be part of enterprise information technology infrastructure and may host a plurality of enterprise applications, enterprise databases, and/or other enterprise resources. Such applications may, for instance, be executed on one or more computing devices included in intelligent database control computing platform 120 using distributed computing technology and/or the like. In some instances, intelligent database control computing platform 120 may include a relatively large number of servers that may support operations of a particular enterprise or organization, such as a financial institution. In addition, and as discussed in greater detail below, various computing devices included in intelligent database control computing platform 120 may be configured to interface with user computing devices 110A-110N, databases 130A-130N, and/or database administrator computing device 140. Through interfacing, intelligent database control computing platform 120 may receive, analyze, and execute database requests, store result set data related to database requests, and/or package result set data for transmission.

Each of the databases 130A-130N may correspond to a relational database and/or a NoSQL database. In some instances, each of the databases 130A-130N may be of a homogenous database type (e.g., relational database) and a homogenous variety, or of a heterogeneous database type and a heterogeneous variety.

The databases 130A-130N may be configured to store data associated with one or more enterprises or organizations, respond to execution commands from intelligent database control computing platform 120 corresponding to database requests provided by users associated with user computing devices 110A-110N, and generate result data sets, based on the execution command provided by intelligent database control computing platform 120, in a manner indicated by the database requests provided by users associated with user computing devices 110A-110N.

Database administrator computing device 140 may be configured to communicate with, and support the operations of, one or more of the user computing devices 110A-110N, intelligent database control computing platform 120, and databases 130A-130N. In particular, database administrator computing device 140 may be able to receive information from intelligent database control computing platform 120 and/or databases 130A-130N related to database requests. Additionally, database administrator computing device 140 may be able to transmit information corresponding to predetermined definitions, which will be described in detail below, that may be used by intelligent database control computing platform 120 and/or databases 130A-130N to analyze and execute database requests provided by users associated with user computing devices 110A-110N.

As will be described in further detail below in regard to FIG. 4, in one or more arrangements, the one or more user computing devices 110A-110N, intelligent database control computing platform 120, one or more databases 130A-

130N, and database administrator computing device 140 may be any type of computing device capable of receiving a user interface, receiving input via the user interface, and communicating the received input to one or more other computing devices. For example, the one or more user computing devices 110A-110N, intelligent database control computing platform 120, one or more databases 130A-130N, and database administrator computing device 140 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of the one or more user computing devices 110A-110N, intelligent database control computing platform 120, one or more databases 130A-130N, and database administrator computing device 140 may, in some instances, be special-purpose computing devices configured to perform specific functions.

As stated above, computing environment 100 also may include one or more networks, which may interconnect one or more of the one or more user computing devices 110A-110N, intelligent database control computing platform 120, one or more databases 130A-130N, and database administrator computing device 140. For example, computing environment 100 may include network 150. Network 150 may include one or more sub-networks (e.g., local area networks (LANs), wide area networks (WANs), or the like).

Referring to FIG. 1B, intelligent database control computing platform 120 may include processor(s) 121, communication interface(s) 122, and memory 123. Communication interface(s) 122 may be a network interface configured to support communication between intelligent database control computing platform 120 and one or more networks (e.g., network 150). Memory 123 may include one or more program modules having instructions that, when executed by processor(s) 121, cause intelligent database control computing platform 120 to perform the automated database request assessments, as well as other functions described herein. For example, memory 123 may have, store, and/or include an intelligent analyzer module 123a, autonomous executor module 123b, result set handler module 123c, result set packager module 123d, execution analyzer module 123e, machine learning module 123f, and control database 123g.

Intelligent analyzer module 123a may have instructions that facilitate many of the automated request assessment processes described herein. For instance, the intelligent analyzer module 123a may decode the data requests provided by the one or more user computing devices 110A-110N into a plurality of objects. Additionally, the intelligent analyzer module 123a may gather resource information from each of the databases from databases 130A-130N specified in the database request. The resource information may include an expected completion time to produce a result set for the request, processing consumption levels, and the detail plans for the request. Further, the intelligent analyzer module 123a may check each of the plurality of objects of the decoded data request with the predetermined definitions including permission definitions (e.g., authentication and authorization details associated with intelligent database control system users), security role definitions (e.g., sensitive data access details and constraints associated with a user), and optimization level definitions (e.g., database utilization information) to ensure compliance and determine a legitimacy score for the database request.

The intelligent analyzer module 123a may compare the legitimacy score against a predetermined threshold. If the legitimacy score is below the predetermined threshold, the intelligent analyzer module 123a may be configured to provide an alert to database administrator computing device 140. If the legitimacy score is above the predetermined threshold, the intelligent analyzer module 123a may provide the database request to autonomous executor module 123b.

The autonomous executor module 123b may have instructions that direct and/or cause the intelligent database control computing platform 120 to format the database request in relation to one or more of the resource information, the legitimacy score, and the predefined definitions. In particular, the autonomous executor module 123b may use one or more of the resource information, legitimacy score, and predetermined definitions to format the database request to produce the appropriate database clauses corresponding to the database request and the particular databases associated with the database request. Additionally, the autonomous executor module 123b may provide the formatted database request to database administrator computing device 140 and may command each of the databases from the one or more databases 130A-130N stipulated by the database request to execute the database request.

In some instances, the autonomous executor module 123b may have further instructions that direct and/or cause the intelligent database control computing platform 120 to format the database request in relation to one or more of the resource information, legitimacy score, and predetermined definitions based on machine learning module 123f and the machine learning algorithms included therein. As such, the autonomous executor module 123b may utilize the machine learning module 123f to format the database request, by way of machine learning algorithms, based on historical execution pattern details stored in control database 123g to ensure the request meets necessary criteria (e.g., abidance with predetermined definitions, resource information, and the like) to be executed.

The result set handler module 123c may have instructions that direct and/or cause the intelligent database control computing platform 120 to receive the result set and execution details and logs associated with the database request from each of the databases that executed the database request and format the received result set in the manner stipulated by the database request. Further, the result set handler module 123c may be configured to transmit the execution details and logs of the database request to the database administrator computing device 140 and store the execution details and logs in the control database 123g.

The result set packager module 123d may have instructions that direct and/or cause the intelligent database control computing platform 120 to package the result set and execution details into the format specified by the database request and transmit the packaged result set and execution details to the user computing device from user computing devices 110A-110N corresponding to the database request. In some instances, the result set packager module 123d may cause the result set and execution details to be displayed on an interface of the user computing device 110A-110N of the user associated with the request corresponding to a user login/session.

Execution analyzer module 123e may have instructions that direct and/or cause the intelligent database control computing platform 120 to analyze the execution details and result set through one or more of Pareto analysis, causal analysis, and failure mode and effect analysis (FMEA). Additionally, the execution analyzer module 123e may be configured to transmit the analysis results to the database administrator computing device 140 and store the analysis results in control database 123g.

Machine learning module 123f may have instructions that direct and/or cause the intelligent database control computing platform 120 to adjust the performance of one or more of the intelligent analyzer module 123a, autonomous executor module 123b, result set handler module 123c, result set packager module 123d, and execution analyzer module 123e based on the database request information stored in control database 123g.

The control database 123g may be configured to store the execution details and logs of the database request and the analysis results provided by execution analyzer module 123e. As stated above, and in some instances, such data may be used by machine learning module 123f to calibrate the machine learning algorithms used by the intelligent analyzer module 123a, autonomous executor module 123b, result set handler module 123c, result set packager module 123d, and execution analyzer module 123e in performing the aspects of the aforementioned processes.

In some arrangements, as will be described in further detail below, intelligent database control computing platform 120 may be configured to interface with user computing devices 110A-110N, databases 130A-130N, and database administrator computing device 140 to perform one or more aspects of the automated database request assessments described herein. In such arrangements, intelligent analyzer module 123a may be configured to receive, decode, and process database requests provided by user computing devices 110A-110N. The autonomous executor module 123b may be configured to format database requests and command the one or more databases 130A-130N to execute the database requests. The result set handler module 123c may be configured to format the result set provided from the executed database request. The result set packager module 123d may be configured to package the result set in the proper format and transmit the formatted result set to the user computing device 110A-110N associated with the database request. The execution analyzer module 123e may be configured to analyze execution details and logs associated with the result set and transmit the results of the analyzed execution details and logs to the database administrator computing device 140. The machine learning module 123f may be configured to adjust the performance of one or more of the intelligent analyzer module 123a, autonomous executor module 123b, result set handler module 123c, result set packager module 123d, and execution analyzer module 123e based on the results of the database request. The control database 123g may be configured to store data including predetermined definitions provided by database administrator computing device 140, user information associated with users of user computing devices 110A-110N, historical data associated with previously performed database requests, and the like.

FIGS. 2A, 2B, 2C, 2D, 2E, and 2F depict an illustrative event sequence for performing automated database request assessments in accordance with one or more example embodiments. To address the above-mentioned technological shortcomings, and in accordance with an embodiment of the disclosure, an intelligent database control system configured to perform automated request assessments may be provided.

Figure 2A:
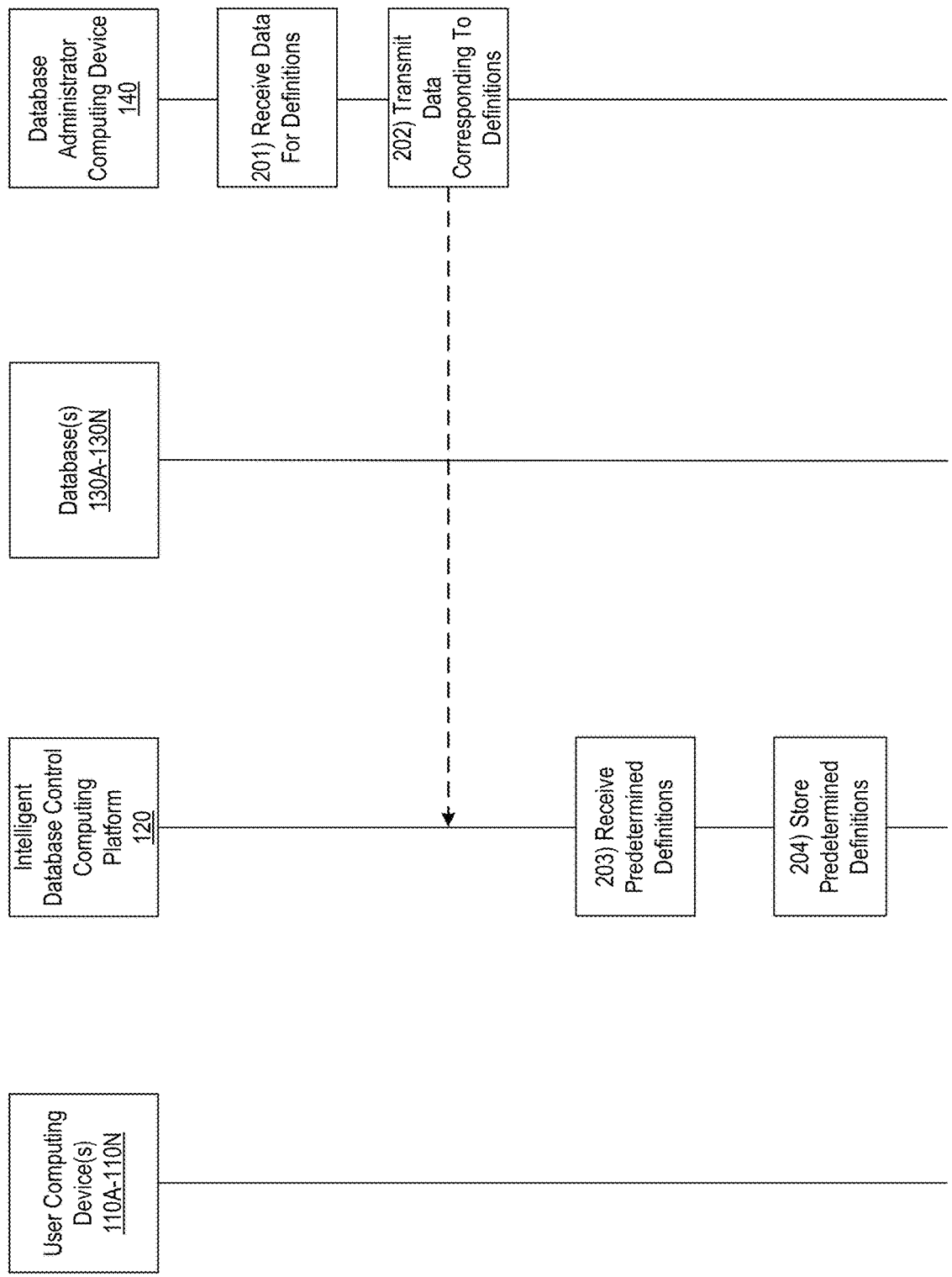

Referring to FIG. 2A, at step 201, the database administrator computing device 140 may receive data corresponding to definitions including permission definitions (e.g., authentication and authorization details associated with intelligent database control system users), security role definitions (e.g., sensitive data access details and constraints associated with a user), and optimization level definitions (e.g., database utilization information) from a database administrator. At step 202, the database administrator computing device 140 may transmit the data corresponding to the definitions to intelligent database control computing platform 120, which may receive the data corresponding to the definitions (e.g., predetermined definitions) at step 203. At step 204, the intelligent database control computing platform 120 may store the data corresponding to the predetermined definitions in control database 123g. As stated above, the predetermined definitions may be utilized by the intelligent database control computing device 120 in performing the automated database request assessment methods described herein.

Figure 2B:
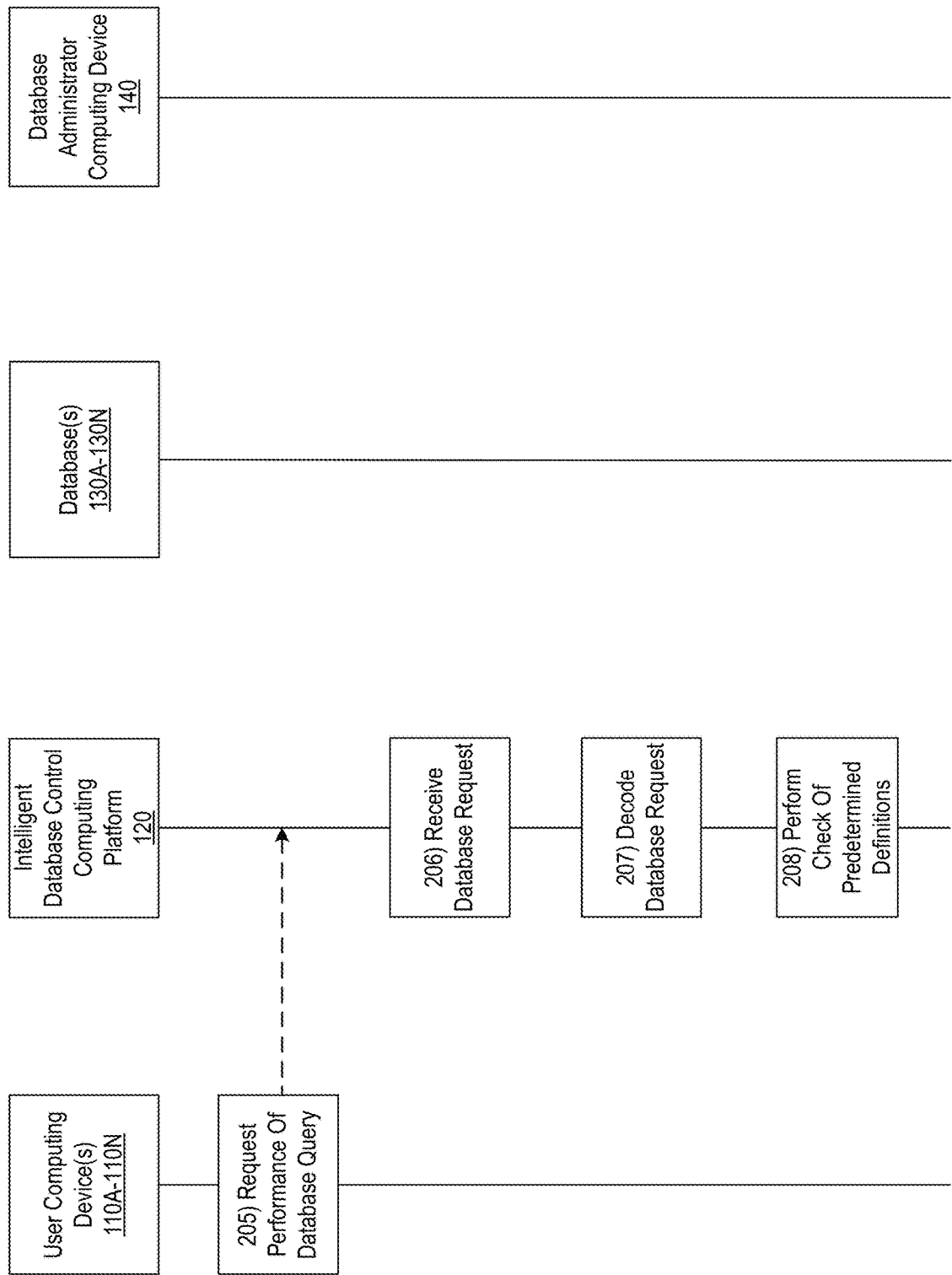

For example, referring to FIG. 2B and step 205, one or more of user computing devices 110A-110N may request performance of a database query. At step 206, the intelligent analyzer module 123a of the intelligent database control computing device 120 may receive the database request from one or more user computing devices 110A-110N. The database request may include a user identification and password associated with a user, an indication of one or more databases 130A-130N to be involved in the database request, schema details of the database request, format of the database query, and the like. At step 207, the intelligent analyzer module 123a of the intelligent database control computing platform 120 may decode the database request into a plurality of database objects corresponding to the information included in the database request (e.g., a user identification and password associated with a user, an indication of one or more databases 130A-130N to be involved in the database request, schema details of the database request, format of the database query, and the like).

At step 208, the intelligent analyzer module 123a may perform a check of the database request to ensure compliance with the predetermined definitions (e.g., permission definitions, security role definitions, and optimization level definitions). In doing so, intelligent analyzer module 123a may compare each of the plurality of database objects generated in step 207 to the corresponding predetermined definitions to check compliance. For example, the intelligent analyzer module 123a may compare each of the plurality of database objects corresponding to the information included in the database request (e.g., a user identification and password associated with a user, an indication of one or more databases 130A-130N to be involved in the database request, schema details of the database request, format of the database query, and the like) with the predetermined definitions including permission definitions (e.g., authentication and authorization details associated with intelligent database control system users), security role definitions (e.g., sensitive data access details and constraints associated with a user), and optimization level definitions (e.g., database utilization information). As such, the intelligent analyzer module 123a may compare the database object associated with user identification and password with the permission definitions and security role definitions to ensure compliance. Further, the intelligent analyzer module 123a may compare the database object associated with the indication of the one or more databases 130A-130N, the schema details, and format of the database query to be involved in the database request with the security role and optimization level definitions.

Figure 2C:
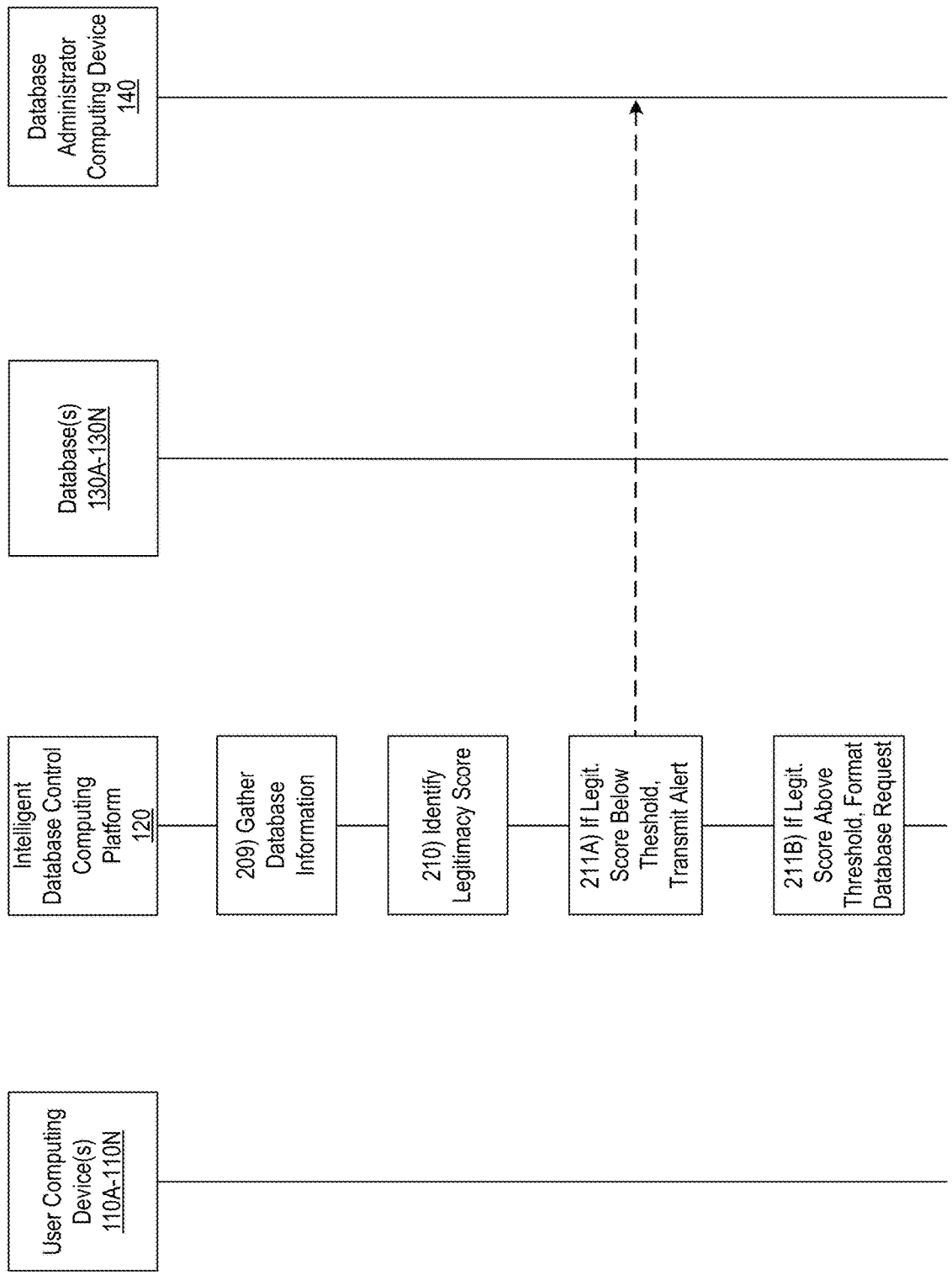

Referring to FIG. 2C, at step 209, the intelligent analyzer module 123a may gather resource information from the one or more databases 130A-130N identified by user including expected processing time and available processing capacity. In doing so, the intelligent analyzer module 123a may request resource information from each of the databases from databases 130A-130N indicated in the database request. In some instances, responsive to requesting the resource information, intelligent analyzer module 123a may identify that the resources of one or more of the databases indicated in the database request are above a predetermined resource threshold and, as such, may delay the performance of the database request until the resource information is identified as being below the predetermined threshold.

At step 210, based on the analysis of the database request regarding compliance with the predetermined definitions received from database administrator computing device 140 in step 202, the intelligent analyzer module 123a may generate a legitimacy score associated with the database request which may reflect the level of compliance with the predetermined definitions. To do so, intelligent analyzer module 123a may use machine learning module 123f to compare each of the plurality of database objects of the database request, based on machine learning algorithms, to historical execution pattern details stored in control database 123g to correlate the plurality of database objects of the database request and predetermined definitions with the historical execution pattern details of a plurality of database objects of previous database requests. As such, intelligent analyzer module 123a may use machine learning module 123f to generate a legitimacy score, based on machine learning algorithms, which corresponds to the compliance of the database request with the predetermined definitions in view of historical execution pattern details.

At step 211A, if the legitimacy score is below the predetermined threshold, the intelligent analyzer module 123a may provide an alert to database administrator computing device 140 for a database administrator to further analyze the database request. The alert may include the legitimacy score and information corresponding to the database request and associated user. In some instances, if the legitimacy score is below the predetermined threshold, it may indicate that the database request does not agree with the predetermined definitions and/or that the efficacy of the database request, as viewed by the relation of the database request and the predetermined definitions, does not track well with the historical execution pattern details.

Conversely, at step 211B, if the legitimacy score is above a predetermined threshold (e.g., 70%, 80%, or the like), the intelligent analyzer module 123a may provide the database request to autonomous executor module 123b of the intelligent database control computing platform 120. As stated above, in some instances, the legitimacy score may be influenced by machine learning algorithms, which may be performed by machine learning module 123f and may provide increased weight to certain aspects of the predetermined definitions based on historical execution pattern details of previous database requests. In some instances, if the legitimacy score is above the predetermined threshold, it may indicate that the database request agrees with the predetermined definitions and/or that the efficacy of the database request, as viewed by the relation of the database request and the predetermined definitions, tracks well with the historical execution pattern details.

Referring to FIG. 2D and step 212, in the event that the legitimacy score is above the predetermined threshold, the autonomous executor module 123b may format the database request based on the predetermined definitions to ensure that data returned from the request abides by the permission definitions, security role definitions, and optimization level definitions. In some instances, the formatting performed by the autonomous executor module 123b may be influenced by historical execution pattern details collected from the execution analyzer module 123e, which will be described in further detail below, based on the degree of matching the user query with the historical execution pattern. In some instances, the autonomous executor module 123b may leverage machine learning module 123f to use machine learning algorithms to format the database request. For example, the autonomous executor module 123b may leverage machine learning module 123f to use machine learning algorithms to format the database request based on the predetermined definitions and historical execution pattern details corresponding to previously executed database requests. As such, the formatting of the database requests may become improved over time.

At step 213, the autonomous executor module 123b may command or instruct (e.g., transmit a signal to) the one or more databases 130A-130N associated with the formatted database request to perform the operations specified in the database request. At step 214, in response to receiving the execution command from the autonomous executor module 123b, the one or more databases 130A-130N associated with the formatted database request may perform the operations specified in the database request to generate a result set. At step 215, each of the one or more databases 130A-130N which executed the database request may transmit the generated result set to the intelligent database control computing platform 120, which may receive the result set at step 216.

Figure 2E:
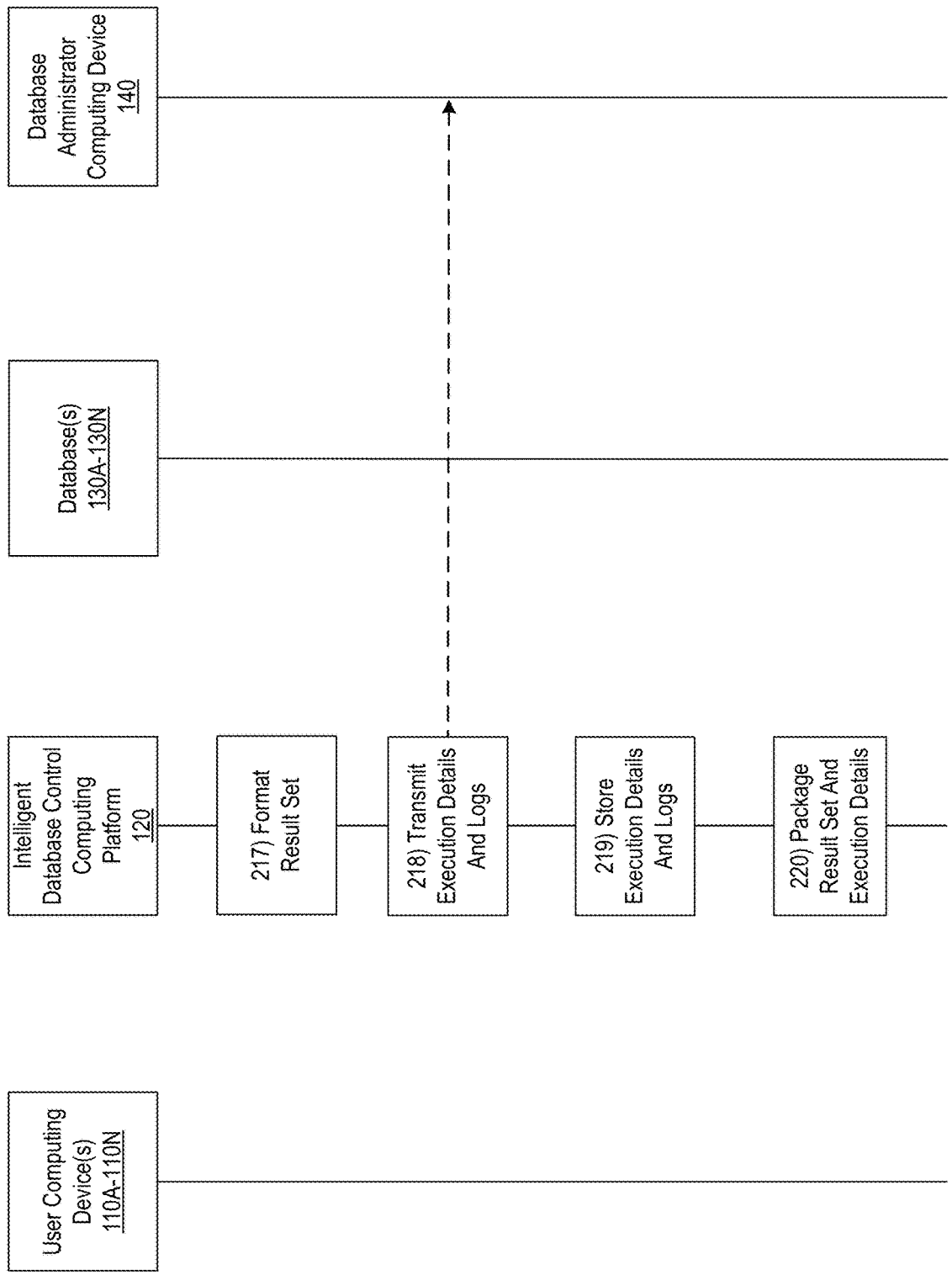

Referring FIG. 2E, at step 217, the result set handler module 123c of the intelligent database control computing platform 120 may format the results of the database request based on criteria specified in the database request and the predetermined definitions. In particular, the results of the database request may be formatted by the result set handler module 123c to ensure compliance with the permission definitions and security role definitions as related to the information comprised within the database request.

Further, at step 218, the result set handler module 123c may transmit the details and logs associated with the database request to the database administrator computing device 140 and store the details and logs in the control database 123g at step 219 for analysis by execution analyzer module 123e, which will be described below. The result set handler module 123c may provide the formatted results of the user database request to the result set packager module 123d. At step 220, the result set packager module 123d may package the result set and the execution details of the database request in the format specified by the input provided by the user associated with the database request.

Referring to FIG. 2F, the result set packager module 123d may transmit the packaged result set and execution details to the user. In some examples, the packaged result set may be transmitted to the user in the form of email. Additionally and/or alternatively, the packaged result set and execution details may be displayed on an interface of the user computing device 110A-110N of the user associated with the request corresponding to a user login/session. At step 222, the user computing device 110A-110N of the user associated with the request may receive the result set and execution details associated with the database request.

At step 223, the execution analyzer module 123d may analyze the set of execution details and logs via one or more of Pareto analysis, causal analysis, and failure mode and effect analysis (e.g., FMEA). In some instances, at step 224, the execution analyzer module 123d may transmit the results of the analyzed execution details and logs to the database administrator computing device 140 for future events prediction and capability prediction. Additionally and/or alternatively, at step 225 and based on the results of the analyzed execution details and logs, the execution analyzer module 123*d* may be configured to revise, update, and/or calibrate the machine learning module 123*f* described herein.

Figure 3:
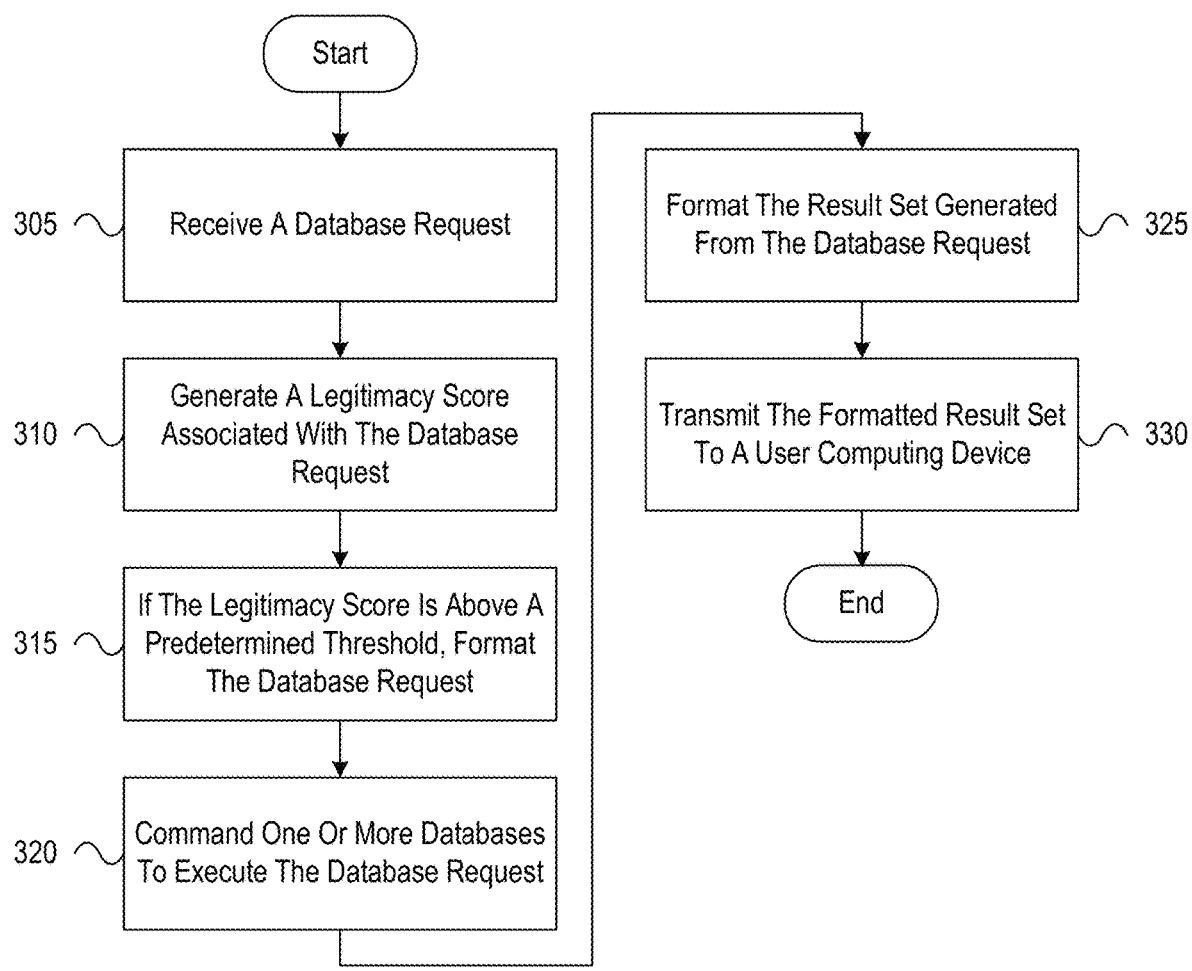
FIG. 3 depicts an illustrative method for performing automated database request assessments in accordance with one or more example embodiments.

FIG. 3 illustrates one example method for performing automated database request assessments in accordance with one or more example embodiments. Referring to FIG. 3, at step 305, a computing device having at least one processor, communication interface, input mechanism, and memory, may receive, via the communication interface, from a user computing device, a database request. At step 310, the computing device may generate a legitimacy score associated with the database request based on one or more predetermined definitions. At step 315, if the legitimacy score is above a predetermined threshold, the computing device may format the database request based on one or more of the predetermined definitions and the legitimacy score. At step 320, the computing device command may command, via the communication interface, one or more databases to execute the database request. At step 325, the computing device may format a result set generated from the executed database request. At step 330, the computing device may transmit, via the communication interface, to the user computing device, the formatted result set.

Figure 4:
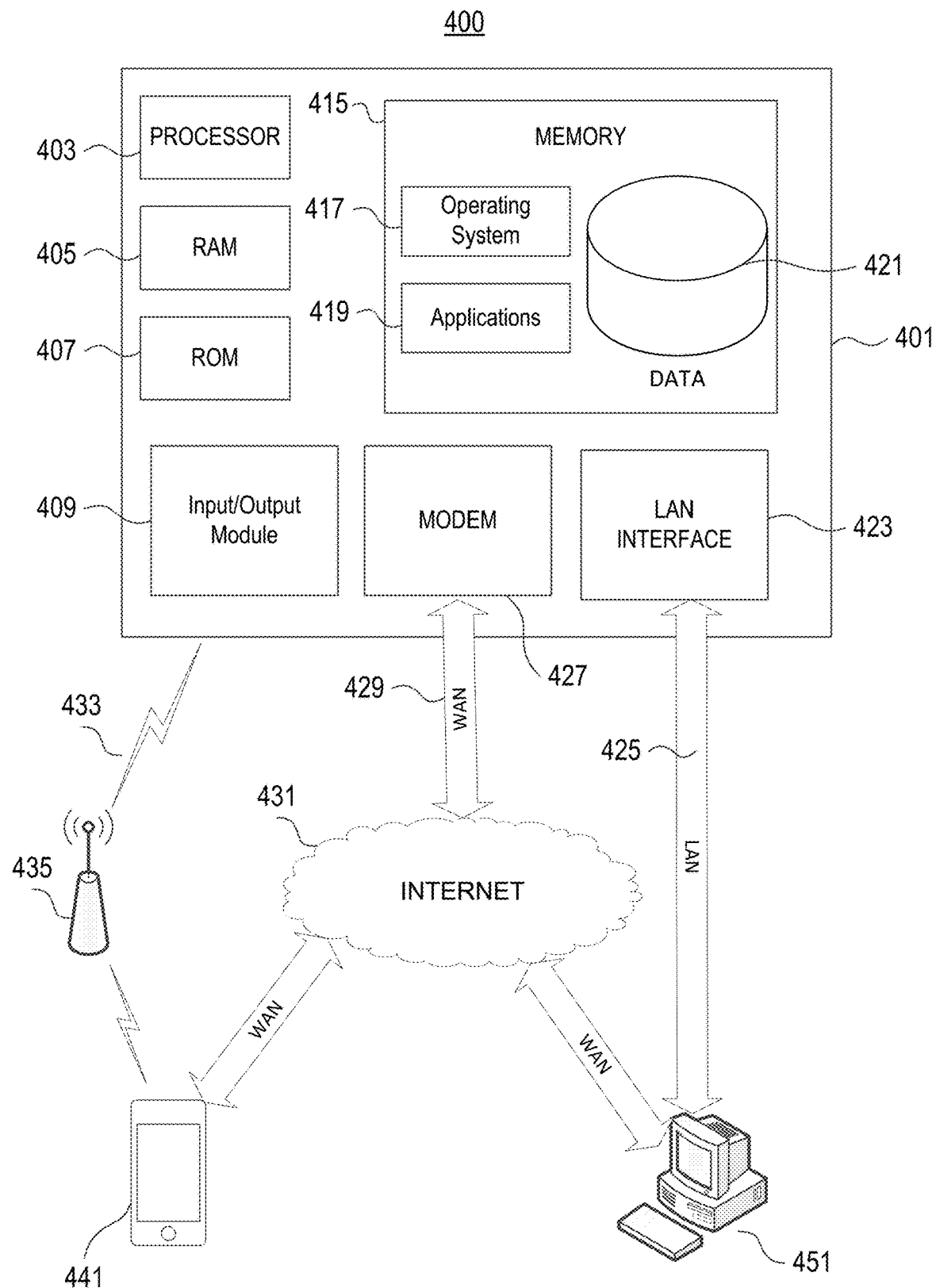
FIG. 4 illustrates a network environment and computing systems that may be used to implement one or more aspects of the disclosure.

FIG. 4 illustrates a block diagram of an intelligent data control computing device 401 in a system that may be used according to one or more illustrative embodiments of the disclosure. The intelligent data control computing device 401 may have a processor 403 for controlling overall operation of the intelligent data control computing device 401 and its associated components, including RAM 405, ROM 407, input/output module 409, and memory unit 415. The intelligent data control computing device 401, along with one or more additional devices (e.g., terminals 441, 451) may correspond to any of multiple systems or devices, such as dispatch management systems, configured as described herein for performing automated request assessments.

Input/Output (I/O) module 409 may include a microphone, keypad, touch screen, and/or stylus through which a user of the intelligent data control computing device 401 may provide input, and may also include one or more of a speaker for providing audio input/output and a video display device for providing textual, audiovisual and/or graphical output. Software may be stored within memory unit 415 and/or other storage to provide instructions to processor 403 for enabling intelligent data control computing device 401 to perform various functions. For example, memory unit 415 may store software used by the intelligent data control computing device 401, such as an operating system 417, application programs 419, and an associated internal database 421. The memory unit 415 includes one or more of volatile and/or non-volatile computer memory to store computer-executable instructions, data, and/or other information. Processor 403 and its associated components may allow the intelligent data control computing device 401 to execute a series of computer-readable instructions to perform the one or more of the processes or functions described herein.

The intelligent data control computing device 401 may operate in a networked environment 400 supporting connections to one or more remote computers, such as terminals/devices 441 and 451. Intelligent data control computing device 401, and related terminals/devices 441 and 451, may include devices installed in vehicles and/or homes, mobile devices that may travel within vehicles and/or may be situated in homes, or devices outside of vehicles and/or homes that are configured to perform aspects of the processes described herein. Thus, the intelligent data control computing device 401 and terminals/devices 441 and 451 may each include personal computers (e.g., laptop, desktop, or tablet computers), servers (e.g., web servers, database servers), vehicle-based devices (e.g., on-board vehicle computers, short-range vehicle communication systems, sensors, and telematics devices), or mobile communication devices (e.g., mobile phones, portable computing devices, and the like), and may include some or all of the elements described above with respect to the intelligent data control computing device 401. The network connections depicted in FIG. 4 include a local area network (LAN) 425 and a wide area network (WAN) 429, and a wireless telecommunications network 433, but may also include other networks. When used in a LAN networking environment, the intelligent data control computing device 401 may be connected to the LAN 425 through a network interface or adapter 423. When used in a WAN networking environment, the intelligent data control computing device 401 may include a modem 427 or other means for establishing communications over the WAN 429, such as network 431 (e.g., the Internet). When used in a wireless telecommunications network 433, the intelligent data control computing device 401 may include one or more transceivers, digital signal processors, and additional circuitry and software for communicating with wireless computing devices 441 (e.g., mobile phones, short-range vehicle communication systems, vehicle sensing and telematics devices) via one or more network devices 435 (e.g., base transceiver stations) in the wireless network 433.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, and WiMAX, is presumed, and the various computing devices and components described herein may be configured to communicate using any of these network protocols or technologies.

Additionally, one or more application programs 419 used by the computing device 401 may include computer executable instructions for receiving data and performing other related functions as described herein.

The various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An intelligent database control computing platform, comprising:
    at least one processor;
    a communication interface communicatively coupled to the at least one processor; and
    memory storing computer-readable instructions that, when executed by the at least one processor, cause the intelligent database control computing platform to:
        receive a plurality of predetermined definitions including at least permission definitions, security role definitions, optimization level definitions;
        receive, via the communication interface, from a user computing device, a database request, the database request including a format for the database request;
        decode the database request into a plurality of objects corresponding to information included in the database request;
        compare each object of the plurality of objects to a corresponding predetermined definition of the plurality of predetermined definitions;
        based on the comparing, determine compliance of the database request with the plurality of predetermined definitions;
        generate, based on the determined compliance of the database request with the plurality of predetermined definitions, a score associated with the database request;
        determine whether the generated score is above a predetermined threshold;
        responsive to determining that the score is above the predetermined threshold, format, using machine learning, the database request based on one or more of the predetermined definitions, the score, and the received format for the database request;
        command, via the communication interface, one or more databases to execute the database request;
        format a result set generated from the executed database request; and
        transmit, via the communication interface, to the user computing device, the formatted result set.

2. The intelligent database control computing platform of claim 1, wherein the score is generated using machine learning algorithms.

3. The intelligent database control computing platform of claim 2, wherein the computer-readable instructions, when executed by the at least one processor, further cause the intelligent database control computing platform to:
    receive, via the communication interface, from the one or more databases, execution details and logs corresponding to the executed database request;
    analyze the execution details and logs based on one or more of Pareto analysis, causal analysis, and failure mode and effect analysis; and
    update the machine learning algorithms used to generate the score based on the analysis of the execution details and logs.

4. The intelligent database control computing platform of claim 1, wherein the computer-readable instructions, when executed by the at least one processor, further cause the intelligent database control computing platform to:
    responsive to determining that the legitimacy score is below the predetermined threshold, transmit, via the communication interface, to a database administrator computing device, an alert regarding the database request.

5. The intelligent database control computing platform of claim 1, wherein the one or more databases are one of a relational database and a NoSQL database.

6. The intelligent database control computing platform of claim 1, instructions that, when executed, cause the intelligent database control computing platform to:
    receive resource information from one or more databases including expected processing time and available processing capacity;
    determine that the resource information from the one or more databases indicates resources above a resource threshold level; and
    delay executing the database request until the resources are below the resource threshold level.

7. A method, comprising:
    at a computing platform comprising at least one processor, memory, and a communication interface:
        receiving, by the at least one processor, a plurality of predetermined definitions including at least permission definitions, security role definitions, optimization level definitions;
        receiving, via the communication interface, from a user computing device, a database request, the database request including a format for the database request;
        decoding, by the at least one processor, the database request into a plurality of objects corresponding to information included in the database request;
        comparing, by the at least one processor, each object of the plurality of objects to a corresponding predetermined definition of the plurality of predetermined definitions;
        based on the comparing, determining, by the at least one processor, compliance of the database request with the plurality of predetermined definitions;
        generating, by the at least one processor and based on the determined compliance of the database request with the plurality of predetermined definitions, a score associated with the database request based;
        determining, by the at least one processor, whether the generated score is above a predetermined threshold;
        responsive to determining that the score is above the predetermined threshold, formatting, using machine learning, the database request based on one or more of the predetermined definitions, the score, and the received format for the database request;
        commanding, via the communication interface, one or more databases to execute the database request;
        formatting a result set generated from the executed database request; and
        transmitting, via the communication interface, to the user computing device, the formatted result set.

8. The method of claim 7, wherein the score is generated using machine learning algorithms.

9. The method of claim 8, further comprising:
    receive, via the communication interface, from the one or more databases, execution details and logs corresponding to the executed database request;
    analyze the execution details and logs based on one or more of Pareto analysis, causal analysis, and failure mode and effect analysis; and
    update the machine learning algorithms used to generate the score based on the analysis of the execution details and logs.

10. The method of claim 7, further comprising:
responsive to determining that the score is below the predetermined threshold, transmitting, via the communication interface, to a database administrator computing device, an alert regarding the database request.

11. The method of claim 10, wherein the one or more databases are one of a relational database and a NoSQL.

12. One or more non-transitory computer-readable media storing instructions that, when executed by a computing device comprising at least one processor, memory, and a communication interface, cause the computing device to:
receive a plurality of predetermined definitions including at least permission definitions, security role definitions, optimization level definitions;
receive, via the communication interface, from a user computing device, a database request, the database request including a format for the database request;
decode the database request into a plurality of objects corresponding to information included in the database request;
compare each object of the plurality of objects to a corresponding predetermined definition of the plurality of predetermined definitions;
based on the comparing, determine compliance of the database request with the plurality of predetermined definitions;
generate, based on the determined compliance of the database request with the plurality of predetermined definitions, a score associated with the database request;
determine whether the generated score is above a predetermined threshold;
responsive to determining that the score is above the predetermined threshold, format, using machine learning, the database request based on one or more of the predetermined definitions, the score, and the received format for the database request;
command, via the communication interface, one or more databases to execute the database request;
format result set generated from the executed database request; and
transmit, via the communication interface, to the user computing device, the formatted result set.

13. The one or more non-transitory computer-readable media of claim 12, wherein the score is generated using machine learning algorithms.

14. The one or more non-transitory computer-readable media of claim 13, storing additional instructions that, when executed by the computing device, cause the computing device to:
receive, via the communication interface, from the one or more databases, execution details and logs corresponding to the executed database request;
analyze the execution details and logs based on one or more of Parato analysis, casual analysis, and failure mode and effect analysis; and
update the machine learning algorithms used to generate the score based on the analysis of the execution details and logs.

15. The one or more non-transitory computer-readable media of claim 12, wherein the one or more databases are one of a relational database and a NoSQL database.

16. The one or more non-transitory computer-readable media of claim 15, storing additional instructions that, when executed by the computing device, cause the computing device to:
responsive to determining that the score is below the predetermined threshold, transmit, via the communication interface, to a database administrator computing device, an alert regarding the database request.

* * * * *

UNITED STATES PATENT AND TRADEMARK OFFICE
CERTIFICATE OF CORRECTION

PATENT NO. : 10,565,214 B2
APPLICATION NO. : 15/465864
DATED : February 18, 2020
INVENTOR(S) : Pidaparthi et al.

Page 1 of 1

It is certified that error appears in the above-identified patent and that said Letters Patent is hereby corrected as shown below:

In the Claims

Column 13, Line 66:
In Claim 4, before "score", delete "legitimacy"

Column 14, Line 42:
In Claim 7, delete "request based;" and insert --request;--

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*